United States Patent
Oka et al.

(10) Patent No.: US 11,719,453 B2
(45) Date of Patent: *Aug. 8, 2023

(54) SYSTEM AND METHOD FOR HEATING AND COOLING

(71) Applicants: Daikin Industries, Ltd., Osaka (JP); Daikin Manufacturing Company, L.P., Waller, TX (US)

(72) Inventors: Masahiro Oka, Osaka (JP); Junichi Shimoda, Osaka (JP); Takashi Shimamura, Osaka (JP); Yuuji Yamada, Osaka (JP); Hideyuki Nakagawa, Houston, TX (US); Hiroyuki Imada, Osaka (JP); David Palazzolo, Houston, TX (US); Joseph Kelly Hearnsberger, Katy, TX (US); Sriram Venkat, Katy, TX (US); Chris Bellshaw, Houston, TX (US); John Clements, Atlanta, GA (US)

(73) Assignees: Daikin Industries, Ltd., Osaka (JP); Daikin Manufacturing Company, L.P., Waller, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/189,208

(22) Filed: Mar. 1, 2021

(65) Prior Publication Data
US 2021/0180818 A1    Jun. 17, 2021

Related U.S. Application Data

(62) Division of application No. 16/250,900, filed on Jan. 17, 2019, now Pat. No. 10,948,208.

(Continued)

(51) Int. Cl.
F24F 11/46        (2018.01)
F24F 1/08          (2011.01)
(Continued)

(52) U.S. Cl.
CPC ............... *F24F 11/46* (2018.01); *F24F 1/08* (2013.01); *F24F 1/32* (2013.01); *F24F 3/065* (2013.01);
(Continued)

(58) Field of Classification Search
CPC ...... F24F 11/46; F24F 1/08; F24F 1/32; F24F 3/065; F24F 11/64; F24F 11/65;
(Continued)

(56) References Cited

U.S. PATENT DOCUMENTS 10,948,208 B2 *  3/2021  Oka ........................ F24F 1/08
2001/0037649 A1 * 11/2001  Fujitaka ................. F25B 41/40
                                                              62/114

(Continued)

*Primary Examiner* — Charles R Kasenge
(74) *Attorney, Agent, or Firm* — K&L Gates LLP

(57) ABSTRACT

An HVAC system is provided. Embodiments of the present disclosure generally relate to an HVAC system in which multiple indoor units are coupled to central outdoor unit, where at least one of the indoor units is configured to provide conditioned air through ductwork and at least one indoor unit is configured to provide conditioned air without ductwork. Moreover, a gas furnace can be provided in the system, for harsher environments that benefit from more robust heating. Additional systems, devices, and methods are also disclosed.

7 Claims, 3 Drawing Sheets

Related U.S. Application Data

(60) Provisional application No. 62/619,824, filed on Jan. 21, 2018.

(51) Int. Cl.

| | | |
|---|---|---|
| *F24F 1/32* | (2011.01) | |
| *F24F 3/06* | (2006.01) | |
| *F24F 11/64* | (2018.01) | |
| *F24F 11/65* | (2018.01) | |
| *F24F 11/80* | (2018.01) | |
| *F24H 3/00* | (2022.01) | |
| *G05B 19/042* | (2006.01) | |
| *F25B 30/02* | (2006.01) | |
| *F25B 49/02* | (2006.01) | |
| *F25B 13/00* | (2006.01) | |
| *F24F 110/10* | (2018.01) | |
| *F24F 110/20* | (2018.01) | |
| *F24F 110/22* | (2018.01) | |
| *F24F 140/30* | (2018.01) | |
| *F24F 140/50* | (2018.01) | |
| *F24F 140/60* | (2018.01) | |

(52) U.S. Cl.
CPC ............. *F24F 11/64* (2018.01); *F24F 11/65* (2018.01); *F24F 11/80* (2018.01); *F24H 3/00* (2013.01); *F25B 13/00* (2013.01); *F25B 30/02* (2013.01); *F25B 49/02* (2013.01); *G05B 19/042* (2013.01); *F24F 2110/10* (2018.01); *F24F 2110/20* (2018.01); *F24F 2110/22* (2018.01); *F24F 2140/30* (2018.01); *F24F 2140/50* (2018.01); *F24F 2140/60* (2018.01); *F24F 2221/54* (2013.01); *F25B 2313/0233* (2013.01); *F25B 2600/0253* (2013.01); *F25B 2600/2513* (2013.01); *G05B 2219/2614* (2013.01)

(58) Field of Classification Search
CPC .... F24F 11/80; F24F 2110/10; F24F 2110/20; F24F 2110/22; F24F 2140/30; F24F 2140/50; F24F 2140/60; F24F 2221/54; F24F 11/54; F24H 3/00; F25B 13/00; F25B 30/02; F25B 49/02; F25B 2313/0233; F25B 2600/0253; F25B 2600/2513; G05B 19/042; G05B 2219/2614; Y02B 30/70
See application file for complete search history.

(56) References Cited

U.S. PATENT DOCUMENTS

| | | | |
|---|---|---|---|
| 2005/0166611 | A1 | 8/2005 | Kanaya |
| 2006/0071086 | A1 | 4/2006 | Kates |
| 2006/0283198 | A1 | 12/2006 | Song et al. |
| 2009/0139251 | A1 | 6/2009 | Masui |
| 2010/0269520 | A1 | 10/2010 | Moore |
| 2012/0253521 | A1 | 10/2012 | Storm et al. |
| 2014/0074730 | A1 | 3/2014 | Arensmeier et al. |
| 2014/0260392 | A1 | 9/2014 | Hawkins et al. |
| 2015/0148965 | A1 | 5/2015 | Lemire et al. |
| 2015/0300698 | A1* | 10/2015 | Tanaka ................ F25B 13/00 62/498 |
| 2016/0320110 | A1 | 11/2016 | Ishida et al. |
| 2018/0031288 | A1* | 2/2018 | Hern .................... F25B 29/003 |
| 2018/0087783 | A1* | 3/2018 | Ingram .................... F24F 13/32 |
| 2018/0094841 | A1* | 4/2018 | Kester .................... F25B 41/34 |
| 2018/0354342 | A1* | 12/2018 | Miyakoshi ........... B60H 1/3213 |

\* cited by examiner

SYSTEM AND METHOD FOR HEATING AND COOLING

CROSS REFERENCE TO RELATED APPLICATIONS

This application claims priority to and benefit of U.S. patent application Ser. No. 16/250,900, which was filed on Jan. 17, 2019, entitled "System and Method for Heating and Cooling," and claims priority to and benefit of U.S. Provisional Patent Application No. 62/619,824, entitled "System and Method for Heating and Cooling," filed on Jan. 21, 2018—both of which are herein incorporated by reference in their entirety.

BACKGROUND

This section is intended to introduce the reader to various aspects of the art that may be related to various aspects of the presently described embodiments—to help facilitate a better understanding of various aspects of the present embodiments. Accordingly, it should be understood that these statements are to be read in this light, and not as admissions of prior art.

Modern residential and industrial customers expect indoor spaces to be climate controlled. In general, heating, ventilation, and air-conditioning ("HVAC") systems circulate an indoor space's air over low-temperature (for cooling) or high-temperature (for heating) sources, thereby adjusting the indoor space's ambient air temperature. HVAC systems generate these low- and high-temperature sources by, among other techniques, taking advantage of a well-known physical principle: a fluid transitioning from gas to liquid releases heat, while a fluid transitioning from liquid to gas absorbs heat.

Within a typical HVAC system, a fluid refrigerant circulates through a closed loop of tubing that uses compressors and other flow-control devices to manipulate the refrigerant's flow and pressure, causing the refrigerant to cycle between the liquid and gas phases. Generally, these phase transitions occur within the HVAC's heat exchangers, which are part of the closed loop and designed to transfer heat between the circulating refrigerant and flowing ambient air. As would be expected, the heat exchanger providing heating or cooling to the climate-controlled space or structure is described adjectivally as being "indoors," and the heat exchanger transferring heat with the surrounding outdoor environment is described as being "outdoors."

The refrigerant circulating between the indoor and outdoor heat exchangers—transitioning between phases along the way—absorbs heat from one location and releases it to the other. Those in the HVAC industry describe this cycle of absorbing and releasing heat as "pumping." To cool the climate-controlled indoor space, heat is "pumped" from the indoor side to the outdoor side. And the indoor space is heated by doing the opposite, pumping heat from the outdoors to the indoors.

Many North American residences employ "ducted" systems, in which a structure's ambient air is circulated over a central indoor heat exchanger and then routed back through relatively large ducts (or ductwork) to multiple climate-controlled indoor spaces. However, the use of a central heat exchanger can limit the ducted system's ability to vary the temperature of the multiple indoor spaces to meet different occupants' needs. This is often resolved by increasing the number of separate systems within the structure—with each system having its own outdoor unit that takes up space on the structure's property, which may not be available or at a premium.

Residences outside of North America often employ "ductless" systems, in which refrigerant is circulated between an outdoor unit and one or more indoor units to heat and cool specific indoor spaces. Unlike ducted systems, ductless systems route conditioned air to the indoor space directly from the indoor unit-without ductwork. Typically, ductless systems are suited for moderate climates, and are not optimal for climates where robust heating of the indoor space may be desired.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to an HVAC system in which multiple indoor units are coupled to central outdoor unit, where at least one of the indoor units is configured to provide conditioned air through ductwork and at least one indoor unit is configured to provide conditioned air without ductwork. Advantageously, using a central outdoor unit for both the ducted and ductless indoor units reduces the total amount of the structure's property used by the HVAC system, for example. Moreover, a gas furnace can be provided in the system, for harsher environments that benefit from more robust heating.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Figure 1:
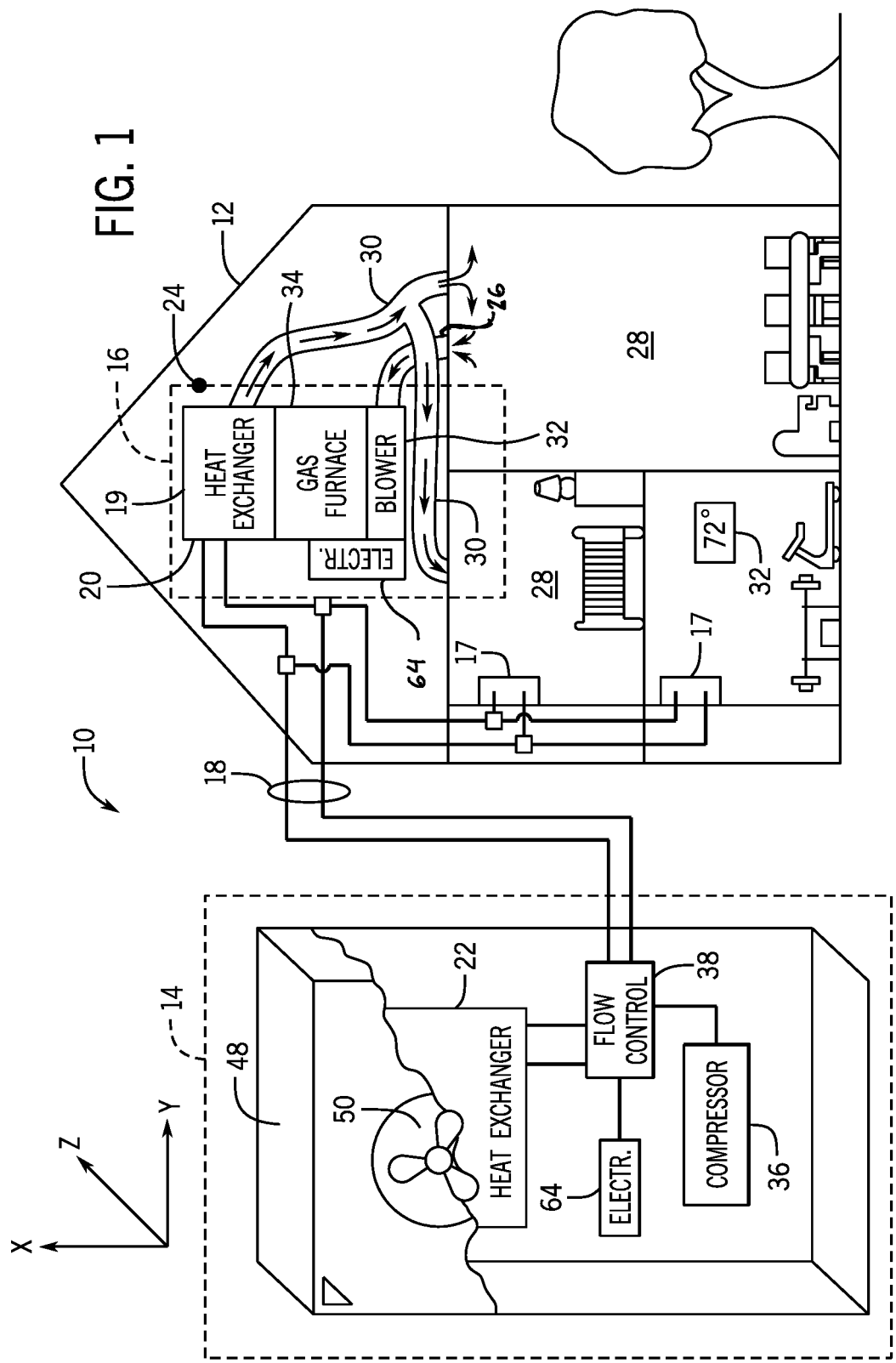
FIG. 1 illustrates schematically an HVAC system for heating and cooling indoor spaces within a structure, in accordance with an embodiment of the present dis closure.

Turning now the figures, FIG. 1 illustrates an HVAC system 10 in accordance with one embodiment. As depicted, the system 10 provides heating and cooling for a residential structure 12. But the concepts disclosed herein are applicable to a myriad of heating and cooling situations, including industrial and commercial settings.

The described HVAC system 10 divides into two primary portions: The outdoor unit 14, which mainly comprises components for transferring heat with the environment outside the structure 12; and the indoor units 16 & 17, which mainly comprise components for transferring heat with the air inside the structure 12. In the illustrated structure, a ducted indoor unit 16 and ductless indoor units 17 provide heating and cooling to various indoor spaces 28.

Focusing on the ducted indoor unit 16, it has an air-handler unit (or AHU) 24 that provides airflow circulation, which in the illustrated embodiment draws ambient indoor air via returns 26, passes that air over one or more heating/cooling elements (i.e., sources of heating or cooling), and then routes that conditioned air, whether heated or cooled, back to the various climate-controlled spaces 28 through ducts or ductworks 30—which are relatively large pipes that may be rigid or flexible. A blower 32 provides the motivational force to circulate the ambient air through the returns 26, AHU, and ducts 30.

As shown, the ducted indoor unit 16 is a "dual-fuel" system that has multiple heating elements. A gas furnace 34, which may be located downstream (in terms of airflow) of the blower 32, combusts natural gas to produce heat in furnace tubes (not shown) that coil through the furnace. These furnace tubes act as a heating element for the ambient indoor air being pushed out of the blower 32, over the furnace tubes, and into the ducts 30. However, the furnace is generally operated when robust heating is desired. During conventional heating and cooling operations, air from the blower 32 is routed over an indoor heat exchanger 20 and into the ductwork 30. The blower, gas furnace, and indoor heat exchanger may be packaged as an integrated AHU, or those components may be modular. Moreover, it is envisaged that the positions of the gas furnace and indoor heat exchangers or blower can be reversed or rearranged.

The indoor heat exchanger 20—which in this embodiment for the ducted indoor unit 16 is an A-coil 19, as it known in the industry—can act as a heating or cooling element that add or removes heat from the structure by manipulating the pressure and flow of refrigerant circulating within and between the A-coil 19 and the outdoor unit 14 via refrigerant lines 18.

In the illustrated embodiment of FIG. 1, the state of the A-coil 19 (i.e., absorbing or releasing heat) is the opposite of the outdoor heat exchanger 22. More specifically, if heating is desired, the illustrated indoor heat exchanger 20 acts as a condenser, aiding transition of the refrigerant from a high-pressure to gas to a high-pressure liquid and releasing heat in the process. And the outdoor heat exchanger 22 acts as an evaporator, aiding transition of the refrigerant from a low-pressure liquid to a low-pressure gas, thereby absorbing heat from the outdoor environment. If cooling is desired, the outdoor unit 14 has flow-control devices 38 that reverse the flow of the refrigerant—such that the outdoor heat exchanger acts as a condenser and the indoor heat exchanger acts as an evaporator. The outdoor unit 22 also contains other equipment—like a compressor 36, which provides the motivation for circulating the refrigerant, and electrical control circuitry 64, which provides command and control signals to various components of the system 10.

The outdoor unit 14 is a side-flow unit that houses, within a plastic or metal casing or housing 48, the various components that manage the refrigerant's flow and pressure. This outdoor unit 14 is described as a side-flow unit because the airflow across the outdoor heat exchanger 22 is motivated by a fan that rotates about an axis that is non-perpendicular with respect to the ground. In contrast, "up-flow" devices generate airflow by rotating a fan about an axis generally perpendicular to the ground. (As illustrated, the X-axis is perpendicular to the ground.) In one embodiment, the side-flow outdoor unit 14 may have a fan 50 that rotates about an axis that is generally parallel to the ground. (As illustrated, the Y- and Z-axes are parallel to the ground.) It is envisaged the either up-flow or side-flow units could be employed. Advantageously, the side-flow outdoor unit 14 provides a smaller footprint than traditional up-flow units, which are more cubic in nature In addition to the ducted indoor unit 16, the illustrated HVAC system has ductless indoor units 17 that also circulate refrigerant, via the refrigerant lines 18, between the outdoor heat exchanger 22 and the ductless indoor unit's heat exchanger. The ductless indoor units 17 may work in conjunction with or independent of the ducted indoor unit to heat or cool the given indoor space 28. That is, the given indoor space 28 may be heated or cooled with the structure's air that has been conditioned by the ductless indoor unit 17 and by the air routed through the ductwork 30 after being conditioned by the A-coil 19, or it may be entirely conditioned by the air coil or the ducted indoor unit working independent of one another. As another embodiment, the A-coil refrigerant loop may be operated to provide cooling or heating only- and the ductless indoor units may also be designed to provide cooling or heating only.

Figure 2:
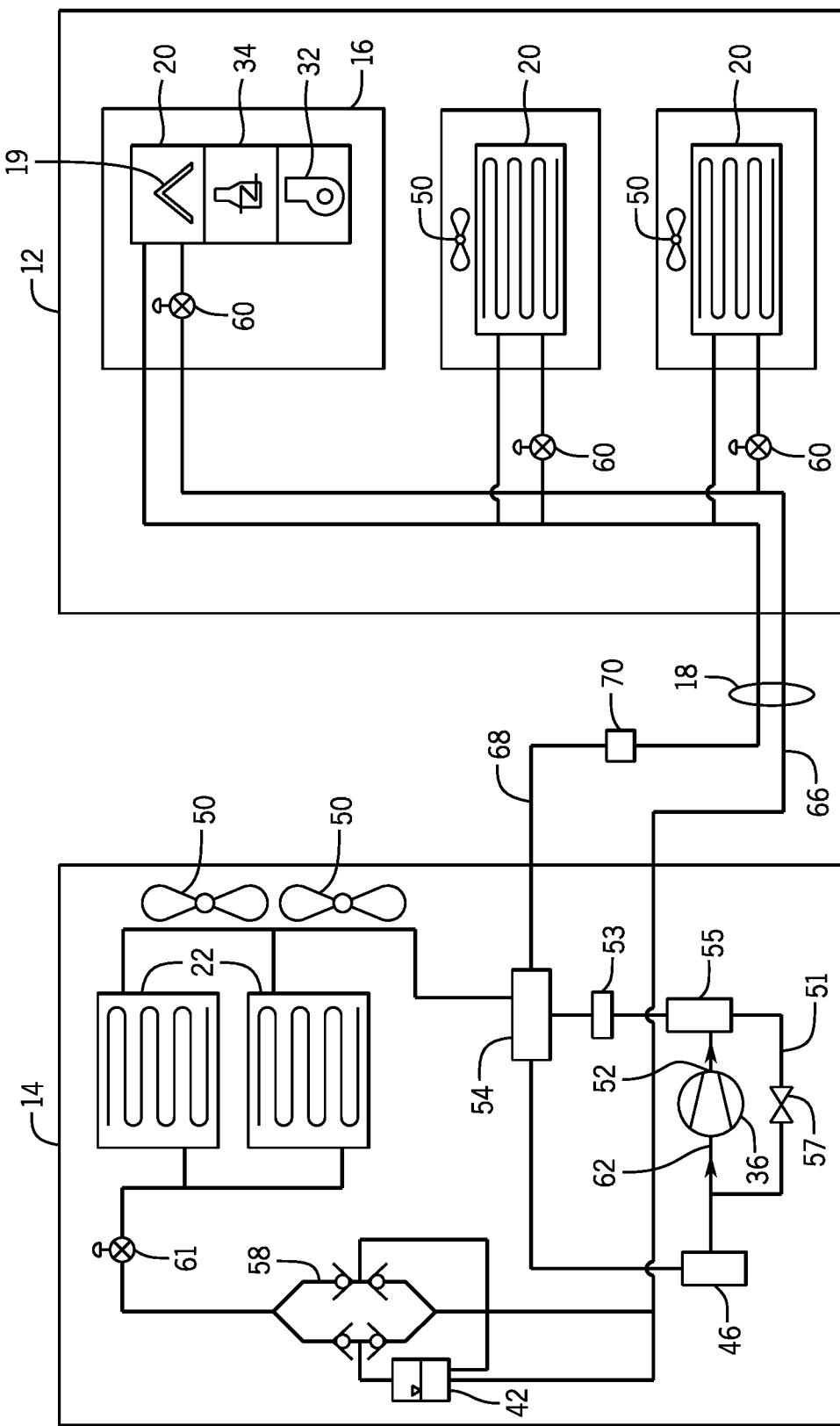
FIG. 2 is a schematic process-and-instrumentation drawing of an HVAC system for heating and cooling indoor spaces within a structure, in accordance with an embodiment of the present disclosure.

FIG. 2 provides further detail about the various components of an HVAC system and their operation. The compressor 36 draws in gaseous refrigerant and pressurizes it, sending it into the closed refrigerant loop 18 via compressor outlet 52. (A flow meter 53 may be used to measure the flow of refrigerant out of the compressor.) The outlet 52 is connected to a reversing valve 54, which may be electronic, hydraulic or pneumatic and which controls the routing of the high-pressure gas to the indoor or outdoor heat exchangers. Moreover, the outlet 52 may be coupled to an oil separator 55 that isolates oil expelled by the compressor and, via a return line 51, returns the separated oil to the compressor inlet 62—to help prevent that expelled oil from reaching the downstream components and helping ensure the compressor maintains sufficient lubrication for operation. The oil return line 51 may include a valve 57 that reduces the pressure of the oil returning to the compressor 36.

To cool the structure, the high-pressure gas is routed to the outdoor heat exchangers 22, where airflow generated by the fans 50 aids the transfer of heat from the refrigerant to the environment—causing the refrigerant to condense into a liquid that is at high-pressure. As shown, the outdoor unit 14 has multiple heat exchangers 22 and fans 50 connected in parallel, to aid the HVAC system's operation.

The refrigerant leaving the heat exchangers 22 is or is almost entirely in the liquid state and flows through or bypasses a metering device 61. From there, the high-pressure liquid refrigerant flows into a series of receiver check valves 58 that manage the flow of refrigerant into the receiver 42. The receiver 42 stores refrigerant for use by the system and provides a location where residual high-pressure gaseous refrigerant can transition into liquid form. And the receiver may be located within the casing 48 of the outdoor unit or may be external to the casing 48 of the outdoor unit. (Or the system may have no receiver at all.) From the receiver 42, the high-pressure liquid refrigerant flows to the indoor units 16, 17, specifically to metering devices 60 that restrict the flow of refrigerant into each heat exchanger 16, 17, to reduce the refrigerant's pressure. The refrigerant leaves the indoor metering devices 60 as a low-pressure liquid. In the described embodiment, the metering device 60 is an electronic expansion valve, but other types of metering devices—like capillaries, thermal expansion valves, reduced orifice tubing—are also envisaged. Electronic expansion valves provide precise control of refrigerant flow into the heat exchangers of the indoor units, thus allowing the indoor units—in conjunction with the compressor—to provide individualized cooling for the given indoor space 28 the unit is assigned to.

Low-pressure liquid refrigerant is then routed to the indoor heat exchangers 20. As illustrated, the indoor heat exchanger 20 for the ducted indoor unit 16 is an "A-coil" style heat exchanger 19. Airflow generated by the blower 32 aids in the absorption of heat from the flowing air by the refrigerant, causing the refrigerant to transition from a low-pressure liquid to a low-pressure gas as it progresses through the indoor heat exchanger 20. And the airflow generated by the blower 32 drives the now cooled air into the ductwork 30, cooling the indoor spaces 28. In a similar fashion, the low-pressure liquid refrigerant is routed to the indoor heat exchangers 20 of the ductless indoor units 17, where it is evaporated, causing the refrigerant to absorb heat from the environment. However, unlike the ducted indoor unit, the ductless indoor units circulate air without ductwork, using a local fan 50, for example.

The refrigerant leaving the indoor heat exchangers 20, which is now entirely or mostly a low-pressure gas, is routed to the reversing valve 54 that directs refrigerant to the accumulator 46. Any remaining liquid in the refrigerant is separated in the accumulator, ensuring that the refrigerant reaching the compressor inlet 62 is almost entirely in a gaseous state. The compressor 36 then repeats the cycle, by compressing the refrigerant and expelling it as a high-pressure gas.

For heating the structure 12, the process is reversed. High-pressure gas is still expelled from the compressor outlet 52 and through the oil separator 55 and flow meter 53. However, for heating, the reversing valve 54 directs the high-pressure gas to the indoor heat exchangers 20. There, the refrigerant—aided by airflow from the blower 32 or the fans 50—transitions from a high-pressure gas to a high-pressure liquid, expelling heat. And that heat is driven by the airflow from the blower 32 into the ductwork 30 or by the fans 50 in the ductless indoor units 17, heating the indoor spaces 28. If more robust heating is desired, the gas furnace 34 may be ignited, either supplementing or replacing the heat from the heat exchanger. That generated heat is driven into the indoor spaces by the airflow produced by the blower 32 or the fans 50.

The high-pressure liquid refrigerant leaving each indoor heat exchanger 20 is routed through or past the given metering valve 60, which is, in this embodiment, an electronic expansion valve. But for other embodiments, the valve may be any other type of suitable expansion valve, like a thermal expansion valve or capillary tubes, for example. Using the refrigerant lines 18, the high-pressure liquid refrigerant is routed to the receiver check valves 58 and into the receiver 42. As described above, the receiver 42 stores liquid refrigerant and allows any refrigerant that may remain in gaseous form to condense. From the receiver, the high-pressure liquid refrigerant is routed to an outdoor metering device 61, which lowers the pressure of the liquid. Just like the indoor metering device 60, the illustrated outdoor metering device 61 is an electrical expansion valve. But it is envisaged that the outdoor metering device could be any number of devices, including capillaries, thermal expansion valves, reduced orifice tubing, for example.

The lower-pressure liquid refrigerant is then routed to the outdoor heat exchangers 22, which are acting as evaporators. That is, the airflow generated by the fans 50 aids the transition of low-pressure liquid refrigerant to a low-pressure gaseous refrigerant, absorbing heat from the outdoor environment in the process. The low-pressure gaseous refrigerant exits the outdoor heat exchanger 22 and is routed to the reversing valve, which directs the refrigerant to the accumulator. The compressor 36 then draws in gaseous refrigerant from accumulator, compresses it, and then expels it via the outlet 52 as high-pressure gas, for the cycle to be repeated.

As illustrated in FIG. 2, the system is a "two-pipe" variable refrigerant flow system, in which the HVAC system's refrigerant is circulated between the outdoor 14 and indoor units via two refrigerant lines 18, one of which is a line that carries predominantly liquid refrigerant (a liquid line 66) and one of which is a line that carries predominately gas refrigerant (a gas line 68). However, it is also envisaged that, in other embodiments, aspects described herein could be applied to a three-pipe variable refrigerant flow system, in which in addition to the gas and liquid lines a third discharge lines aids in the circulation of refrigerant.

In many instances, the structure 12 may have had a previous HVAC system with pre-existing refrigerant piping at least partially built into the structure's interior walls. For example, the pre-existing system may be a traditional HVAC unit that uses circulating refrigerant for cooling only and a gas furnace for heating, with all of the conditioned air delivered to the interior spaces via the ductwork. And the pre-existing refrigerant lines—which are built into the walls of the structure—may have a gas line with a ⅝ inch, ⅞ inch, or ⅜ inch outer diameter gas line. However, in certain embodiments, the outdoor unit 14 may have more modern refrigerant piping, which tends to be smaller in outer diameter. For example, the outdoor unit 14 may be 2, 3, or 4 Ton unit that has a gas line diameter of ⅝ inch. It would be laborious and cost ineffective to replace the pre-existing gas line in the structure with ⅝ inch diameter tubing. Accordingly, the illustrated HVAC system includes a coupler 70 that helps couple the varying diameter gas lines to one another. For example, the coupler 70 may facilitate coupling of the outdoor unit's ⅝ inch diameter gas line to the structure's pre-existing ⅝ inch, ⅞ inch, ⅝ inch diameter gas line. In another embodiment, the outdoor unit 14 may be a 5 Ton unit with a gas line having a diameter of ⅝ inch. The coupler could facilitate coupling of this outdoor unit with a pre-existing gas line of ⅞ inch or ⅝ inch diameter.

Figure 3:
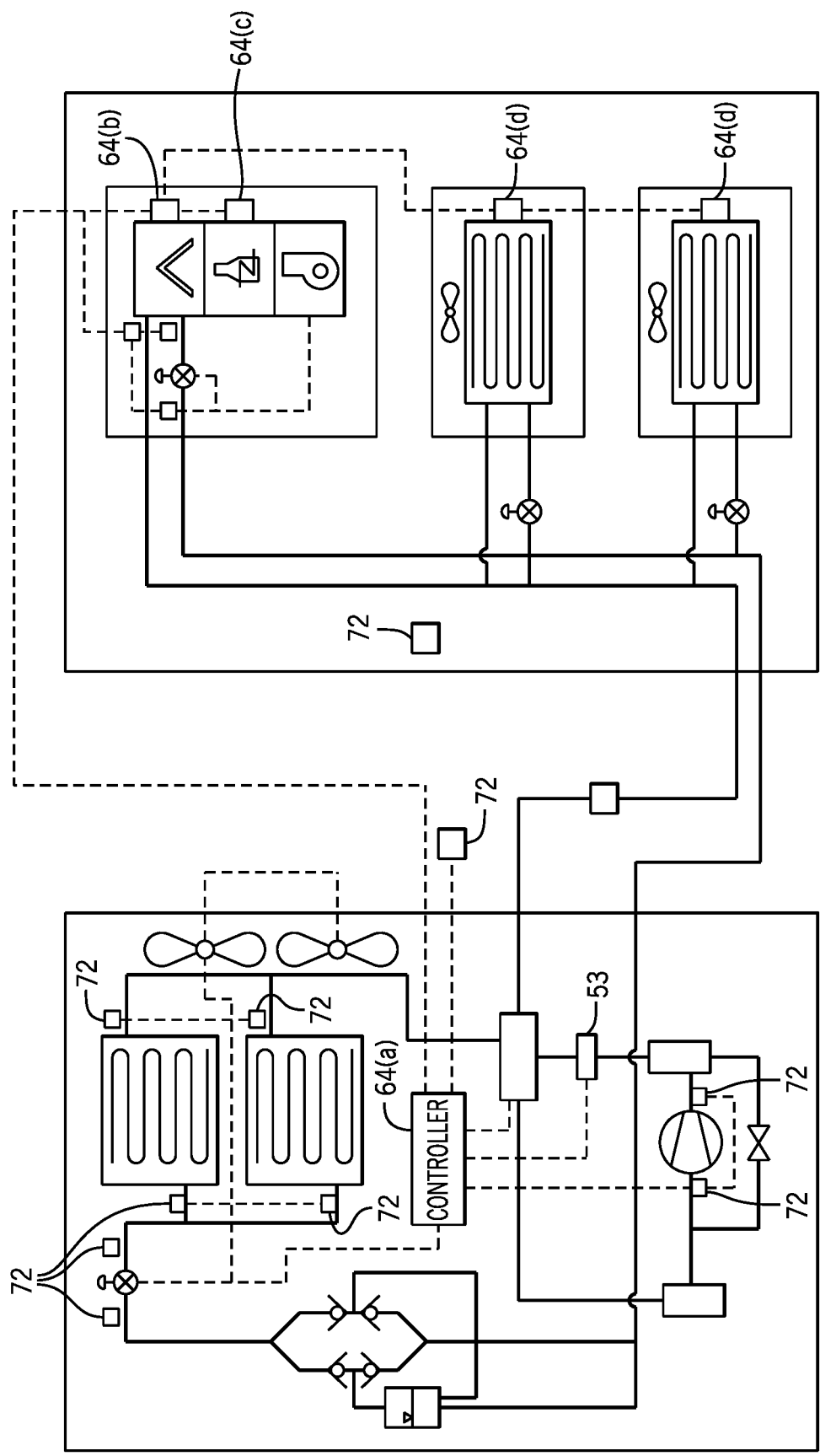
FIG. 3 is a schematic electrical diagram illustrating a command and control communication network for an HVAC system, in accordance with an embodiment of the present disclosure.

FIG. 3 illustrates the HVAC system 10 of FIG. 2, but provides further information about the HVAC system's control architecture. As illustrated, the HVAC system 10 includes one or more controllers 64 that manage the operating of the HVAC's system's components. Specifically, the illustrated system includes a controller 64(a) for the outdoor unit 14, a controller 64(b) for the indoor air coil 19, controller 64(c) for the gas furnace 34 and controllers 64(d) for the ductless indoor units 17.

These controllers send command and control signals to a myriad of components within each controller's device and to each other. For example, the outdoor unit's controller 64(a) may receive input data from a wide variety of temperature and/or pressure sensors 72 providing information about the condition of the refrigerant or the surrounding environment. Moreover, the controller may be in communication with various components of the system—for example, the fan 50, the compressor 36, the receiver 42—that send operation data (e.g., motor speed, liquid level in the receiver) to the controller.

In response to that information, the controller may determine the best operating parameters for various components in the system and provide appropriate commands. For example, the controller may actuate the metering device 61 to control the device's open or closed status. Or the controller may vary the operating speed for the fans 50 or compressor 36. Similarly, the controllers 64(b), 64(c), 64(d) of the indoor unit provide like data collection and operational commands to the components of their respective units.

Additionally, the controllers 64(a)-64(d) may be in communication with one another. In one embodiment, the outdoor unit's controller 64(a) can be in communication with A-coil controller 64(b)—with the two controllers communicating via a common protocol, like ClimateTalk. And the A-coil controller 64(b) may be communicating with the gas furnace controller 64(c), again via ClimateTalk, as one example of a protocol.

However, as illustrated, the ductless indoor unit's controllers 64(d) may be receiving data and providing command and control signals via a different protocol, like the P1/P2 protocol used by Daikin Industries, Ltd. Because the two controllers—64(b) and 64(d)—operate off of different protocols, the HVAC system includes translations features-which might be provided as hardware or through software stored in memory on the controllers—that facilitate communications between the different protocols and, thus, the different controllers. As a result, the entire HVAC system is able to provide data and communicate and receive and send command instructions as a unit, even though the system is operating off of two or more protocols. In fact, the use of the translation features allows for new equipment, like the ductless indoor units 17, to be installed in a structure that was originally designed and has equipment for a ducted system. In the past, installing the ductless indoor units meant adding an additional outdoor unit that is designed to communicate over a P1/P2 protocol, for example, because the installed ducted system was designed to communicate over a ClimateTalk protocol. Moreover, these command and control communications may be over a wired bus or network, or may be communicated over a wireless network.

As an alternative embodiment, the outdoor unit's controller 64(a) may communicate first with the controllers 64(d) of the indoor units over a protocol like P1/P2. Then, using translation features as described above, the controller 64(d) of the indoor unit may communicate with the controller 64(b) of the A-coil, which may be operating off of a ClimateTalk protocol.

The illustrated controllers 64 may be a programmable logic circuit or a processor or integrated circuit with memory, for example. As one particular example, one or more of the disclosed controllers 64 includes inverter circuitry that conditions a received electrical signal to vary the speed of the compressor's motor, thereby regulating the amount of refrigerant the compressor pumps. Moreover, the inverter circuitry—which changes the frequency of the current motivating various electronic components like motors—can be used to control the speed of other components, like fans 50 or blowers 32. It is believed that the inverter circuitry can improve the efficiency of the HVAC system in comparison to traditional system, which operate the compressor motor at a single speed and in a binary (on/off) manner.

However, it is also envisaged that the command of the controllers could be centralized into one controller located in either the indoor or outdoor units, or it could be decentralized to multiple controllers located throughout the HVAC system, or those controllers may be located at a remote location accessible through a network or the Internet.

With reference to FIGS. 1-3, the illustrated HVAC system 10 can be operated in manners that are believed to be beneficial. For example, the system may include an oil-recovery operation that reduces the amount of lubricant—such as mineral oil—resident outside of the compressor. Circulating refrigerant includes a small amount of lubricant, to lubricate the moving parts of the compressor. But the lubricant provides little benefit to the other components of the HVAC system. In fact, stray lubricant expelled by the compressor and circulated with the refrigerant can negatively impact the system's overall performance and reduce the amount of lubricant available to the compressor. To mitigate stray lubricant, the HVAC system has an "oil-recovery" mode, where the system operates to increase the flow velocity of the refrigerant, by increasing the rotational speed of the compressor, to help carry the stray refrigerant back to the compressor 36, where it is removed by the oil separator 55. But, in the oil-recovery mode, the system may not provide the heating or cooling functions desired in the indoor spaces 28. Thus, activation of the oil-recovery mode is reduced.

In traditional systems, activation of the oil recovery mode is based on the number of rotations of the compressor. That is, traditional systems estimate the amount of stray oil in the system based on the number of rotations of the compressor. However, the inventors have found that measuring the number of compressor rotations does not provide an accurate estimate of stray oil—often overestimating the amount and causing the system to operate in an oil-recovery mode more frequently than necessary.

In the illustrated system, the amount of stray oil is estimated on the circulation amount or flow rate of the refrigerant. This can be calculated by the controllers 64 using the myriad of input data from the sensors described above, or can be measured directly using a flow meter 53. It is believed that estimating stray oil based on the circulation amount is more accurate, allowing the system to spend more time addressing the called for heating and cooling needs rather than transitioning to and focusing on an oil-recovery mode.

As another advantage, the illustrated system can provide heating even when the system is in a defrost mode. When the refrigerant is circulating to provide heating to the structure, the outdoor heat exchanger 22 absorbs heat from the surrounding environment. If the outside ambient temperature is low, this could cause moisture in the air to freeze onto the outdoor heat exchanger. The outdoor heat exchanger 22 is defrosted by switching the system into a cooling state, causing the outdoor exchanger 22 to become the condenser, which expels heat and melts the accumulating ice. In the present system, because heating can be provided via a gas furnace as well as the circulating refrigerant, the indoor space 28 may remain at the desired temperature, minimizing discomfort to the occupants.

In accordance with another embodiment, the system may include a dew-prevention system that reduces the likelihood of condensation forming on the refrigerant lines, which can damage the structure. For example, the structure's previous HVAC system may have been used under different operating conditions, conditions that did not necessitate insulation of the pre-existing liquid line 66 to mitigate condensation (or dew) from forming on the line. And removing or replacing the pre-existing lines may not be economic or feasible.

The described HVAC system includes a methodology that uses data from the system's various sensors and controllers to prevent the formation of dew. As the refrigerant travels through the uninsulated piping to heat the structure, it cools, and may cool to the point that the now condensed liquid refrigerant's temperature is lower than the temperature at which moisture in the surrounding air condenses on the piping, causing dew. In general, the risk for dew formation can be rudimentarily quantified using the following formula:

(("Determined Dew Point Temperature [DDPT])–
(Refrigerant Temperature[RT]))*(Length of
Time RT<DDPT):

where DDTP is the calculated dew point, which may be based on temperature and humidity sensors in the system measuring the surrounding environment, or may be provided by an external source in communication with the system; where RT is the measured temperature of the refrigerant at a downstream point in the line; and where Length of Time RT<DDPT is the length of time the refrigerant temperature has been less than the determined dew point temperature.

Increasing the temperature of the refrigerant in the liquid line helps to preclude dew formation. This is effected, in the heating mode, by actuating the outdoor unit's 14 electronic expansion valve 61, reducing its orifice size and restricting the flow of the liquid refrigerant into the heat exchangers 22 that are acting as evaporators. Less refrigerant flow into the evaporators 22 "starves" them, causing the refrigerant to transition entirely to the gaseous stage at an earlier point in the evaporators. As a result, the refrigerant can continue to absorb heat as it flows through the evaporators and becomes more "superheated." And returning gas refrigerant at a higher temperature to the accumulator 46 causes the residual liquid in it to turn to gas, driving more of the refrigerant into circulation. Moreover, the controllers in the system can raise the expected superheat temperature of the refrigerant leaving the evaporators, with the controller actuating the expansion valve 61 to reach the desired superheat temperature.

The combination of increased refrigerant circulation with restricted flow of refrigerant into the evaporator causes an increase in the amount of liquid refrigerant in the liquid line. And, since that liquid cannot be compressed, the overall temperature in the liquid line remains at a higher temperature than if that valve 61 were less restricted.

As an additional measure, the controller may change the target temperature for the refrigerant egressing the indoor units 20, which are acting as condensers, to reduce the amount of sub-cooling. Specifically, the controller 64 can effect operation of the expansion valves 60, 61 and/or the compressor 36 to increase the temperature of the refrigerant leaving the condensers 20.

If one or more of the indoor units 16, 17 is not being asked to heat its given indoor space 28, the expansion valve 60 of that unit can be opened further, to allow for the circulation of the refrigerant that may have been previously restricted. Concurrently, if the fans 50 in those units are operating to circulate air, the speed of those fans can be reduced, causing the temperature of the refrigerant in those units to increase.

As another measure, if the gas furnace 34 is active, the expansion valve 60 of the ducted unit 16 can be opened to allow more refrigerant from the A-coil 19 to flow into the liquid line.

If the above-described actions are not having the desired effect, and the RT remains close to the DDPT, the controller can send a signal to the operating indoor unit 17, for example, to reduce the amount of heating provided by the unit to the given indoor space 28. Moreover, the fan speed of that indoor unit can be reduced as well. This reduces the amount of heat that is transferred to the indoor space 28, heat that remains in the circulating refrigerant.

Lastly, if all of the above-described mitigation techniques do not produce the desired outcome, the controller 64 may be programmed to deactivate the system entirely, electing to cease heating operations rather than potentially damaging the structure through dew formation.

Along the same lines, the system can be operated with dew-control methodology when in the cooling mode. For example, if the pressure of the refrigerant is less than the vapor pressure for the refrigerant at the measured environmental temperature, that increases the change for dew formation. To mitigate this, the system can be programmed to decrease the fan speed of the operating outdoor unit, to increase the temperature of the refrigerant in the liquid line.

It is envisaged that the foregoing described steps could be performed sequentially, or certain subsets of methods may be selected in various sequences to effect the desired result.

There are number of refrigerants that can be used by the HVAC system. For example, the system 10 may circulate a single refrigerant, such as R32. Or the system may employ a composite of multiple refrigerants. For example, the system may employ refrigerants with the following composition (by weight):

|  | R32 (% weight) | R125 (% weight) | R1234yf (% weight) |
| --- | --- | --- | --- |
| Composite Refrigerant |  |  |  |
| DR-55 | 67.0 | 7.0 | 26.0 |
| R410 | 50.0 | 50.0 | 0.0 |
| DR-5 | 72.5 | 0.0 | 27.5 |

As a another potential embodiment, the HVAC system may employ a hydrofluoro-olefin (HFO) refrigerant. The employed HFO refrigerant may by of a single type or a composite. For example, the system may employ HFO refrigerants with the following composition (by weight):

|  | HFO-1123 (% weight) | R32 (% weight) |
|---|---|---|
| Composite Refrigerant |  |  |
| HFO-Mix 1 | 45.0 | 55.0 |
| HFO-Mix 2 | 40.0 | 60.0 |

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An HVAC system for providing conditioned air to a structure:
an outdoor unit configured to operate a compressor at variable speeds;
a plurality of indoor units configurable to provide conditioned air to the structure, wherein the plurality of indoor units comprises:
a ducted indoor unit comprising a first expansion valve for controlling refrigerant flow; and
a ductless indoor unit comprising a second expansion valve for controlling refrigerant flow; and
a gas furnace.

2. The HVAC system of claim 1, wherein the outdoor unit is configured to couple to refrigerant piping that was previously coupled to a different outdoor unit.

3. The HVAC system of claim 2, wherein the outer diameter of the refrigerant piping in the structure that conveys refrigerant in predominately in gas phase between the indoor units and the outdoor unit is larger than the outer diameter of the outdoor unit's corresponding piping for routing refrigerant in predominately in gas phase.

4. The HVAC system of claim 1, wherein the refrigerant comprises at least 50%, in terms of weight, R32 refrigerant.

5. The HVAC system of claim 1, wherein the refrigerant at least partially comprises a hydrofluoro-olefin (HFO) refrigerant.

6. The HVAC system of claim 1, wherein the plurality of indoor units comprises a plurality of ductless indoor units.

7. The HVAC system of claim 1, comprising an oil-recovery system configured to estimate an amount of stray oil in the HVAC system based the flow rate of refrigerant in a refrigerant line coupling at least one of the indoor units to the outdoor unit.

\* \* \* \* \*